United States Patent [19]

Hill

[11] Patent Number: 5,392,524
[45] Date of Patent: Feb. 28, 1995

[54] APPARATUS FOR ALIGNING HANDLE VALVES DURING INSTALLATION OF A FAUCET

[75] Inventor: Loran R. Hill, Indianapolis, Ind.

[73] Assignee: Masco Corporation of Indiana, Indianapolis, Ind.

[21] Appl. No.: 76,307

[22] Filed: Jun. 11, 1993

[51] Int. Cl.[6] .............................................. G01B 5/25
[52] U.S. Cl. ........................................ 33/412; 33/483; 33/645; 33/654; 33/563
[58] Field of Search ................. 33/412, 464, 483, 494, 33/809, 520, 529, 613, 645, 654, 562, 563; 7/163, 164; 269/904; 81/13, 55; 411/87, 91, 92

[56] References Cited

U.S. PATENT DOCUMENTS

| | | | |
|---|---|---|---|
| 1,131,053 | 3/1915 | Garland | 411/91 |
| 2,102,897 | 12/1937 | Holnut | 81/13 |
| 2,196,929 | 4/1940 | Lizakowski | 81/13 |
| 2,314,950 | 3/1943 | Pope | 33/563 |
| 2,611,949 | 9/1952 | Wanamaker | 81/13 |
| 3,008,554 | 11/1961 | Hodgson | 411/92 |
| 3,097,843 | 7/1963 | Morrow | . |
| 3,159,394 | 2/1964 | Burns | . |
| 3,245,643 | 4/1966 | Burns | . |
| 3,279,080 | 10/1966 | Stepshinski | 33/613 |
| 3,319,691 | 5/1967 | Fisher | 411/90 |
| 3,698,060 | 10/1972 | Helton | . |
| 3,780,443 | 12/1973 | Smith | 33/613 |
| 3,952,419 | 4/1976 | Fohl | 33/563 |
| 4,177,569 | 12/1979 | Greer | 33/562 |
| 4,671,483 | 6/1987 | Harbeke | . |
| 4,770,399 | 9/1988 | Sossen et al. | . |
| 4,958,814 | 9/1990 | Johnson | . |

FOREIGN PATENT DOCUMENTS

| | | | |
|---|---|---|---|
| 0212796 | 8/1984 | Germany | 33/529 |
| 17430 | of 1914 | United Kingdom | 33/613 |
| 281870 | 12/1927 | United Kingdom | 81/13 |

*Primary Examiner*—Thomas B. Will
*Attorney, Agent, or Firm*—Myron B. Kapustij; Malcolm L. Sutherland

[57] ABSTRACT

A handle stop aligning and holding apparatus for facilitating the installation of valve assemblies in a faucet having wide spread valves. The apparatus is an integral one-piece, flat, elongate plate having a plurality of openings longitudinally spaced from each other at preselected intervals. The openings are adapted to receive and hold against rotation handle stops of valve assemblies.

4 Claims, 1 Drawing Sheet

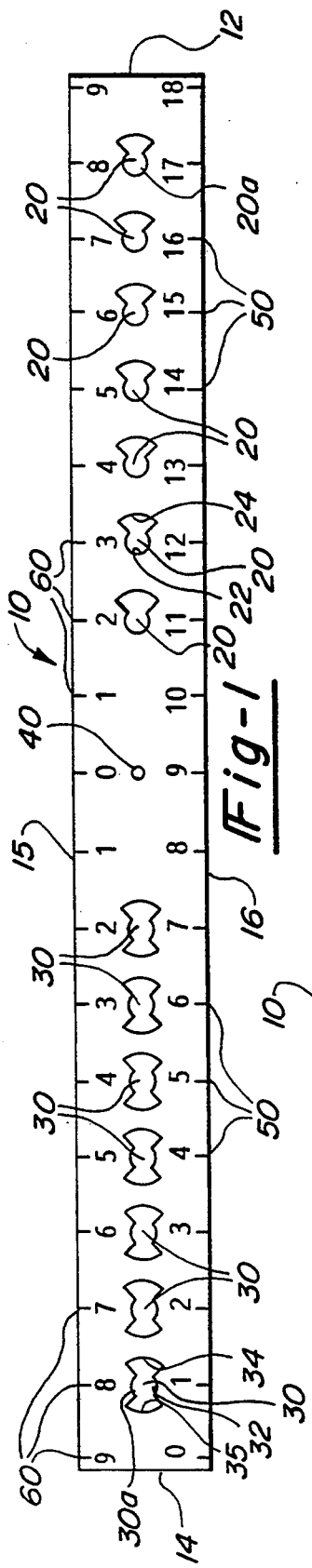
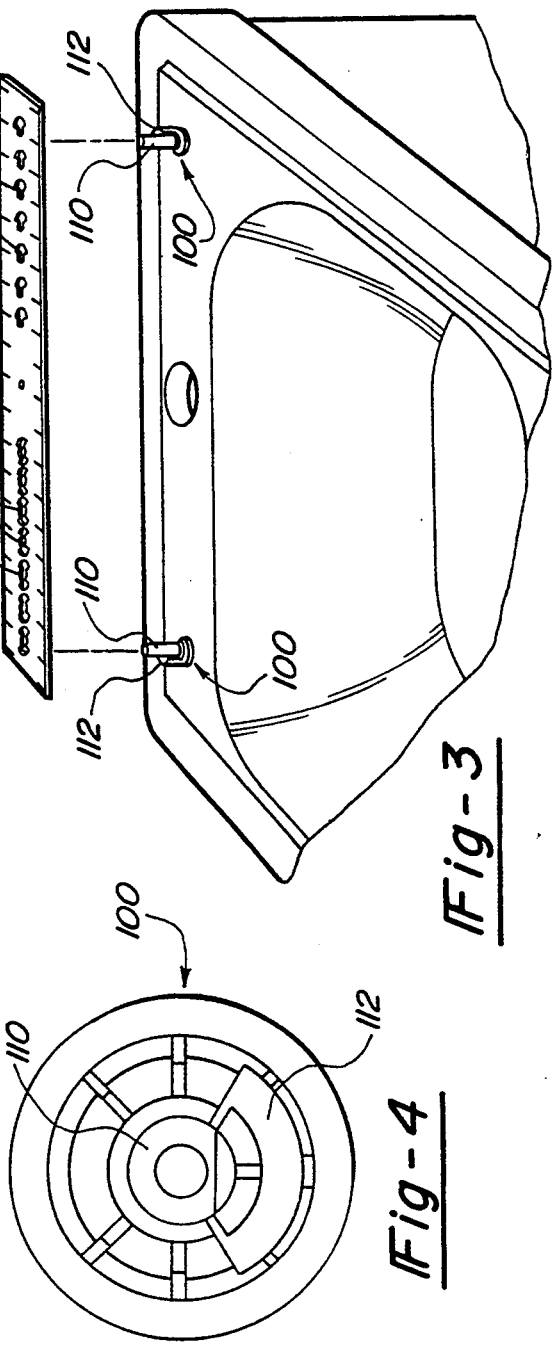

APPARATUS FOR ALIGNING HANDLE VALVES DURING INSTALLATION OF A FAUCET

FIELD OF THE INVENTION

This invention relates to aligning and holding apparatus and more particularly to aligning and holding apparatus especially suitable for plumbing applications, particularly for facilitating the installation of faucets having two spaced apart handle valves.

BACKGROUND OF THE INVENTION

In installing faucets with two wide spread handles a problem is encountered during installation of valve assemblies in holding the two valve assemblies in a properly aligned position while tightening them from under the sink. If the valve assemblies, particularly the handle stops, are misaligned during installation the handles, which are normally mounted on the valves after the valve have been installed in the sink or countertop, will not be properly aligned with each other. There thus exists a need for a device which holds the two valve assemblies, particularly the handle stops of the assemblies, in predetermined positions while the valve assemblies are being secured to the sink in order to insure and maintain proper relative positioning and alignment of the handle stops with a minimum of time and effort. The instant invention provides such a device which is relatively simple and easy to use.

SUMMARY OF THE INVENTION

The instant invention is directed to an aligning and holding apparatus for holding against rotational movement and consequent misalignment handle stops of valve assemblies of faucets which have two spaced apart handle valves during the installation of such faucets. The apparatus of the present invention is an elongate, relatively flat, relatively thin integral member having a plurality of longitudinally spaced apart openings extending therethrough. The openings are located at predetermined positions and are adapted to fit over valve stems and handle stops of valve assemblies to keep the handle stops from rotating and becoming misaligned during installation. By using the apparatus of the instant invention the valves are held against movement during assembly to the sink so that the handles, once installed, will be properly oriented relative to each other and the spout.

BRIEF DESCRIPTION OF THE DRAWINGS

FIG. 1 is a top plan view of the aligning and holding apparatus of the instant invention;

FIG. 2 is a side view in elevation of the apparatus of FIG. 1;

FIG. 3 is an exploded perspective view of the apparatus of the invention and two faucet handle valves; and FIG. 4 is a top plan view of a faucet handle valve of FIG. 3 illustrating the valve stem and handle stop.

DESCRIPTION OF THE PREFERRED EMBODIMENT

The aligning and holding apparatus 10 of the instant invention comprises an elongated, relatively flat, thin and relatively rigid integral planar plate having a front leading edge 12, a rear edge 14, and two side edges 15 and 16. A plurality of longitudinally spaced apart openings 20, 30 are provided at predetermined and preselected intervals. For example, in the embodiment illustrated openings 20 are provided at one inch intervals, and openings 30 are also provided at one inch intervals. The openings are of two types. The first type 20 is comprised of a generally circular central portion 22 and a radially extending fan shaped side portion 24. The second type 30 is comprised of a generally circular center portion 32 and two radially extending fan shaped side portions 34 and 35. Fan shaped side portions 34 and 35 are spaced apart 180°. The central circular portion 22 of opening 20 and central portion 32 of opening 30 are adapted to fit over and receive a valve stem 110. The fan shaped side portion 24 of opening 20 and side portions 34 and 35 of opening 30 are adapted to fit over and receive handle stop 112. A third type of opening, 40, generally circular in shape is located midway between front edge 12 and rear edge 14. The purpose of openings 20 and 30, more specifically side sections 24, 34 and 35, is to hold and secure handle stops 112 against rotation. The purpose of opening 40 is for spout location in the case holes, e.g., valve assembly holes, spout holes, or both valve assembly holes and spout holes, must be drilled in the sink or countertop.

In the embodiment illustrated openings 20 are disposed between opening 40 and leading edge 12, while openings 30 are disposed between opening 40 and rear edge 14.

Indicia, particularly measurement indicia such as distance in inches, 50 and 60 are disposed on apparatus 10. Indicia 50 are disposed adjacent side edge 16 while indicia 60 are disposed adjacent side edge 16.

In the preferred embodiment illustrated the apparatus is made from metal, preferably aluminum or a light weight alloy of aluminum but may also be made from a plastic or resin material having good dimensional stability and rigidity.

In operation, as illustrated in FIG. 3, the aligning and holding apparatus 10 is placed over the valve stems 110 and handle stops 112 of valves 100. More specifically, as illustrated in FIG. 3, the central circular section 24 of opening 20 is placed over valve stem 110 and the fan shaped section 24 is placed over handle stop 112 of the right valve assembly 100 of a pair of handle valves while circular central section 32 of opening 30 is placed over valve stem 110 and fan shaped section 35 is placed over handle stop 112 of the left valve assembly 100.

In FIG. 3 the two valve assemblies 100 are about 16 inches apart and openings 20a and 30a are utilized. If the valve assemblies are spaced a lesser distance apart openings 30 and 20 which lie closer to central opening 40 can be utilized.

With the valve stems 110 and handle stops 112 of the two valve assemblies disposed in the appropriate openings in the apparatus, e.g., 30a and 20a, the two valve assemblies can be secured to the sink and/or to the pipes underneath the sink. Once the valve assemblies are securely mounted the apparatus is lifted off the valve stems and handle stops. Appropriate handles are then mounted on the valve stems.

In view of the foregoing, it is readily apparent that the apparatus of the present invention provides a device for dependably holding the handle stops of valve assemblies against rotation while the valve assemblies are attached to the sink and corresponding pipes. The apparatus enables such attachment operation to be accomplished by a single person readily and easily with the apparatus being thereafter easily removable from the valve stems. Furthermore, since the apparatus 10 has a plurality of longitudinally spaced apart openings 20 and 30 it can be used with valve assemblies whose distance from each other varies.

What is claimed is:

1. An aligning and holding device for handle stops of faucet valve assemblies comprising an elongated plate containing a plurality of openings at longitudinally spaced, predetermined intervals wherein at least one of said openings is comprised of a central circular shaped section adapted to receive a valve stem and two radially extending fan shaped side sections adapted to receive a handle stop.

2. The device of claim 1 wherein at least one other of said openings is comprised of a central circular shaped section adapted to receive a valve stem and a radially extending fan shaped side section adapted to receive a handle stop.

3. The device of claim 1 wherein said two fan shaped side sections are spaced apart 180°.

4. The device of claim 3 wherein said device further contains distance measuring indicia thereon.

* * * * *